(12) United States Patent
Yang et al.

(10) Patent No.: US 12,154,212 B2
(45) Date of Patent: Nov. 26, 2024

(54) GENERATING ENVIRONMENTAL DATA

(71) Applicant: Waymo LLC, Mountain View, CA (US)

(72) Inventors: Zhenpei Yang, Austin, TX (US); Yuning Chai, San Mateo, CA (US); Yin Zhou, San Jose, CA (US); Pei Sun, Palo Alto, CA (US); Henrik Kretzschmar, Mountain View, CA (US); Sean Rafferty, Sunnyvale, CA (US); Dumitru Erhan, San Francisco, CA (US); Dragomir Anguelov, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 582 days.

(21) Appl. No.: 17/098,943

(22) Filed: Nov. 16, 2020

(65) Prior Publication Data

US 2021/0150799 A1 May 20, 2021

Related U.S. Application Data

(60) Provisional application No. 62/936,326, filed on Nov. 15, 2019.

(51) Int. Cl.
*G06T 17/05* (2011.01)
*B60W 30/095* (2012.01)
(Continued)

(52) U.S. Cl.
CPC ......... *G06T 15/04* (2013.01); *B60W 30/0956* (2013.01); *B60W 50/06* (2013.01);
(Continued)

(58) Field of Classification Search
CPC ...... G06V 10/70; G06V 10/774; G06V 10/82; G06V 20/56; G06T 2207/20084; G06T 2207/20081; G06T 17/05
See application file for complete search history.

(56) References Cited

U.S. PATENT DOCUMENTS 6,639,597 B1 * 10/2003 Zwicker ................ G06T 15/405
345/428
10,460,463 B2 10/2019 Whelan et al.
(Continued)

FOREIGN PATENT DOCUMENTS

EP 3304492 4/2018
GB 2538751 11/2016
(Continued)

OTHER PUBLICATIONS

"Mipmap." Wikipedia, Wikimedia Foundation, Nov. 2, 2018, https://web.archive.org/web/20181102155659/https://en.wikipedia.org/wiki/Mipmap (Year: 2018).*
(Continued)

*Primary Examiner* — Ryan McCulley
(74) *Attorney, Agent, or Firm* — Fish & Richardson P.C.

(57) ABSTRACT

Methods, systems, and apparatus, including computer programs encoded on computer storage media, for generated simulated sensor data. One of the methods includes obtaining a surfel map generated from sensor observations of a real-world environment and generating, for each surfel in the surfel map, a respective grid having a plurality of grid cells, wherein each grid has an orientation matching an orientation of a corresponding surfel, and wherein each grid cell within each grid is assigned a respective color value. For a simulated location within a simulated representation of the real-world environment, a textured surfel rendering is generated, including combining color information from grid cells vis-
(Continued)

ible from the simulated location within the simulated representation of the real-world environment.

20 Claims, 3 Drawing Sheets

(51) Int. Cl.
  *B60W 50/06*   (2006.01)
  *B60W 60/00*   (2020.01)
  *G06N 3/045*   (2023.01)
  *G06N 3/08*   (2023.01)
  *G06T 7/70*   (2017.01)
  *G06T 9/00*   (2006.01)
  *G06T 15/00*   (2011.01)
  *G06T 15/04*   (2011.01)

(52) U.S. Cl.
  CPC ........... *B60W 60/001* (2020.02); *G06N 3/045* (2023.01); *G06N 3/08* (2013.01); *G06T 7/70* (2017.01); *G06T 9/002* (2013.01); *G06T 15/00* (2013.01); *G06T 17/05* (2013.01); *B60W 2420/403* (2013.01); *B60W 2420/408* (2024.01); *G06T 2207/20081* (2013.01); *G06T 2207/20084* (2013.01); *G06T 2207/30248* (2013.01)

(56) References Cited

U.S. PATENT DOCUMENTS

| | | | |
|---|---|---|---|
| 11,565,709 B1* | 1/2023 | Caldwell | B60W 50/00 |
| 2019/0147582 A1 | 5/2019 | Lee et al. | |
| 2019/0228571 A1 | 7/2019 | Atsmon | |
| 2019/0240580 A1 | 8/2019 | Lego | |
| 2020/0051327 A1* | 2/2020 | Dolan | G06F 15/04 |
| 2020/0065635 A1* | 2/2020 | Lim | G06F 18/10 |
| 2020/0250794 A1* | 8/2020 | Zimmer | G06T 3/4069 |
| 2021/0110526 A1* | 4/2021 | Jaipuria | G06N 3/045 |
| 2021/0201546 A1* | 7/2021 | Andersson | G16H 30/40 |

FOREIGN PATENT DOCUMENTS

| | | |
|---|---|---|
| KR | 20190038808 | 4/2019 |
| WO | WO 2019/089121 | 5/2019 |

OTHER PUBLICATIONS

Behley et al., "Efficient Surfel-Based SLAM using 3D Laser Range Data in Urban Environments," Robotics: Science and Systems, Jun. 2018, 10 pages.
PCT International Search Report and Written Opinion in International Appln. No. PCT/US2020/060687, dated Feb. 26, 2021, 10 pages.
International Preliminary Report on Patentability in International Appln. No. PCT/US2020/060687, dated May 27, 2022, 7 pages.
Arjovsky et al., "Wasserstein Generative Adversarial Networks," Proceedings of the 34th International Conference on Machine Learning, 2017, 70:214-223.
Bansal et al., "Chauffeurnet: Learning to drive by imitating the best and synthesizing the worst," CoRR. Dec. 2018, arxiv.org/abs/1812.03079, 20 pages.
Brodeur et al., "Home: A household multimodal environment," CoRR, Nov. 2017, arXiv:1711.11017, 6 pages.
Chai et al., "Multipath: Multiple probabilistic anchor trajectory hypotheses for behavior prediction.," CoRR, Oct. 2019, arXiv:1910.05449, 13 pages.
Chang et al, "Matterport3d: Learning from rgb-d data in indoor environments," CoRR, Sep. 2017, arXiv:1709.06158, 25 pages.
Cordts et al., "The cityscapes dataset for semantic urban scene understanding," Proceedings of the IEEE Conference on Computer Vision and Pattern Recognition, 2016. 11 pages.
Creswell et al., "Generative adversarial networks: An overview," IEEE Signal Processing Magazine, Jan. 2018, 35(1):53-65.
Curless et al., "A volumetric method for building complex models from range images," Proceedings of the 23rd annual conference on Computer graphics and interactive techniques, Aug. 1996, pp. 303-312.
Dosovitskiy et al., "CARLA: An open urban driving simulator," Proceedings of the 1st Annual Conference on Robot Learning, 2017, 78:1-16.
Everett et al., "Motion planning among dynamic, decision-making agents with deep reinforcement learning," 2018 IEEE/RSJ International Conference on Intelligent Robots and Systems, Oct. 2018, 8 pages.
Furukawa et al., "Accurate, dense, and robust multi-view stereopsis," IEEE Computer Society Conference on Computer Vision and Pattern Recognition, Jul. 2007, 32(8):1362-1376.
Goodfellow et al., "Generative adversarial nets," CoRR, Jun. 2014, arxiv.org/abs/1406.2661, 9 pages.
He et al., "A twofold siamese network for real-time object tracking," Proceedings of the IEEE Conference on Computer Vision and Pattern Recognition, 2018, pp. 4834-4843.
He et al., "Deep residual learning for image recognition," Proceedings of the IEEE Conference on Computer Vision and Pattern Recognition, 2016, pp. 770-778.
He et al., "Mask r-cnn," Proceedings of the IEEE International Conference on Computer Vision, 2017, pp. 2961-2969.
http://ccwu.me/vsfm/doc.html [online], "VisualSFM : A Visual Structure from Motion System," Nov. 2013, retrieved on Feb. 12, 2021, retrieved from URL<http://ccwu.me/vsfm/doc.html>, 10 pages.
Ioffe et al., "Batch normalization: Accelerating deep network training by reducing internal covariate shift," Proceedings of the 32nd International Conference on Machine Learning, 2015, 37:448-456.
Isola et al., "Image-to-image translation with conditional adversarial networks," Proceedings of the IEEE Conference on Computer Vision and Pattern Recognition, 2017, pp. 1125-1134.
Kar et al., "Meta-sim: Learning to generate synthetic datasets," Proceedings of the IEEE/CVF International Conference on Computer Vision, 2019, pp. 4551-4560.
Karras et al., "Progressive growing of gans for improved quality, stability, and variation," CoRR, Oct. 2017, arXiv:1710.10196, 26 pages.
Kazhdan et al., "Poisson surface reconstruction," Proceedings of the fourth Eurographics symposium on Geometry processing, Jun. 2006, 7:10 pages.
Kingma et al., "Adam: A method for stochastic optimization," CoRR, Dec. 2014, arXiv:1412.6980, 15 pages.
Li et al., "AADS: Augmented autonomous driving simulation using data-driven algorithms," CoRR, Jan. 2019, arXiv:1901.07849, 13 pages.
Lim et al., "Geometric GAN," CoRR, May 2017, arxiv.org/abs/1705.02894, 17 pages.
Lin et al., "Microsoft COCO: common objects in context," European Conference on Computer Vision, 2014, pp. 740-755.
Liu et al., "SSD: Single shot multibox detector," European conference on computer vision, 2016, pp. 21-37.
Miyato et al., "Spectral normalization for generative adversarial networks," CoRR, Feb. 2018, arXiv:1802.05957, 26 pages.
Park et al., "Deepsdf: Learning continuous signed distance functions for shape representation," Proceedings of the IEEE/CVF Conference on Computer Vision and Pattern Recognition, 2019, pp. 165-174.
Park et al., "Semantic image synthesis with spatially-adaptive normalization," Proceedings of the IEEE Conference on Computer Vision and Pattern Recognition, 2019, pp. 2337-2346.
Pfister et al., "Surfels: Surface elements as rendering primitives," Proceedings of the 27th annual conference on Computer graphics and interactive techniques, Jul. 2000, pp. 335-342.

(56) References Cited

OTHER PUBLICATIONS

Ros et al., "The synthia dataset: A large collection of synthetic images for semantic segmentation of urban scenes," Proceedings of the IEEE conference on computer vision and pattern recognition, 2016, pp. 3234-3243.

Sang et al., "An improved YOLOv2 for vehicle detection," Sensors, 2018, 18(12):4272.

Segal et al., "Generalized-icp," Proceedings of Robotics: Science and Systems, Jun. 2009, 8 pages.

Song et al., "Semantic scene completion from a single depth image," Proceedings of the IEEE Conference on Computer Vision and Pattern Recognition, 2017, pp. 1746-1754.

Ullman, "The interpretation of structure from motion," Proceedings of the Royal Society of London. Series B. Biological Sciences, Jan. 1979, 203(1153):405-426.

Wang et al., "Video-to-video synthesis," CoRR, Aug. 2018, arXiv:1808.06601, 14 pages.

Wu et al., "Building generalizable agents with a realistic and rich 3D environment," CoRR, Jan. 2018, arXiv:1801.02209, 15 pages.

Wymann et al., "TORCS, the open racing car simulator," Software available at http://torcs.sourceforge.net, 2000, 4(6):2.

Xia et al., "Gibson Env: Real-world perception for embodied agents," Proceedings of the IEEE Conference on Computer Vision and Pattern Recognition, 2018, pp. 9068-9079.

Zhang et al., "Self-attention generative adversarial networks," Proceedings of the 36th International Conference on Machine Learning, 2019, 97:7354-7363.

Zhu et al., "Unpaired image-to-image translation using cycle-consistent adversarial networks," Proceedings of the IEEE International Conference on Computer Vision, 2017, pp. 2223-2232.

Park et al., "Probabilistic Surfel Fusion for Dense LiDAR Mapping," Proceedings of the IEEE International Conference on Computer Vision, 2017, pp. 2418-2426.

Schops et al., "SurfelMeshing: Online Surfel-Based Mesh Reconstruction," CoRR, Oct. 2018, arxiv.org/abs/1810.00729v1, 13 pages.

Stuckler et al., "Efficient Mobile Robot Navigation using 3D Surfel Grid Maps," In Proc. of the German Conference on Robotics, May 2012, 5 pages.

Stuckler et al., "Multi-Resolution Surfel Maps for Efficient Dense 3D Modeling and Tracking," Journal of Visual Communication and Image Representation, Jan. 2014, 25(1):137-147.

Wang et al., "Real-time Scalable Dense Surfel Mapping," 2019 International Conference on Robotics and Automation, May 2019, pp. 6919-6925.

Extended Search Report in European Appln. No. 20886614.5, dated Mar. 26, 2024, 15 pages.

Kobbelt et al., "A survey of point-based techniques in computer graphics," Computers & Graphics, Dec. 2004, 28(6):801-814.

Guennebaud et al., "Dynamic surfel set refinement for high-quality rendering," Computers and graphics, Dec. 2004, 28(6):827-838.

Holst et al., "Surfel-based billboard hierarchies for fast rendering of 3D-objects," Eurographics symposium on point-based graphics, 2007, pp. 109-118.

Pfister et al., "Surfels: surface elements as rendering primitives," Computer Graphics, Jul. 2000, pp. 335-342.

Search Report in European Appln. No. 20886614.5, dated Nov. 14, 2023, 15 pages.

\* cited by examiner

GENERATING ENVIRONMENTAL DATA

CROSS-REFERENCE TO RELATED APPLICATIONS

This application claims priority to U.S. Application Ser. No. 62/936,326, filed on Nov. 15, 2019, the entirety of which is herein incorporated by reference.

BACKGROUND

This specification relates to generating artificial sensor data for autonomous vehicle applications.

Autonomous vehicles include self-driving cars, boats, and aircraft. Autonomous vehicles use a variety of on-board sensors and computer systems to detect nearby objects and use such detections to make control and navigation decisions.

For safety and scalability purposes, the control systems of autonomous vehicles are commonly trained in simulations rather than in actual real-world traffic settings. In a simulation, the control system of an autonomous vehicle can be tested on simulated environments having complex and diverse traffic scenarios. The quality of the simulations as a tool for training the control systems of an autonomous vehicle is typically highly dependent on the quality of the simulated environment.

However, conventional approaches for generating such simulated environments typically require tedious, manual creation of the simulated environments. For example, developers can use state-of-the-art game engines to manually create environments having objects with high realism, such as buildings, pedestrians, and trees. But this highly-manual approach to creating simulated environments is not scalable and thus not a realistic way to generate the amounts of data needed to train the control systems of autonomous vehicles.

SUMMARY

This specification describes how a system can use a surfel map to generate simulated sensor data for performing autonomous vehicle simulations. In some implementations, the simulated sensor data is generated by a Generative Adversarial Network (GAN) that is trained to use a surfel-based representation of an environment to generate realistic images that are more realistic and have more detail than prior art techniques.

In this specification, a surfel is a surface patch having a location in 3D space, one or more shape and size parameters, and an orientation. Surfels can be collectively used to approximate surfaces in 3D space. The location in space of a surfel can be represented in any appropriate coordinate system. In some implementations, a system can divide the environment being modeled into volume elements (voxels) and generate one surfel for each voxel in the environment that intersects with a surface.

The shape and size parameters specify the shape and size of the surfel. For example, a surfel can be rectangular, ovular, or circular. In order to simplify and compress the surfel representation, a system can use disc surfels in which all surfels have the same shape and same size. For example, the system can represent all surfels using circular discs that all have the same radius. The orientation of a surfel represents how the surfel is oriented in the environment. The orientation can be represented in any appropriate coordinate system. For example, the orientation can be represented by a normal vector having x, y, and z coordinates that represents a direction of a vector that is normal to a plane defined by the surfel.

Particular embodiments of the subject matter described in this specification can be implemented so as to realize one or more of the following advantages. A system can automatically generate large amounts of high-quality simulated sensor data in a scalable way. This allows a system to generate high-quality simulated environmental data for locations in environments that have not actually been visited. These techniques thus allow for simulations to explore novel paths for which no trip log data exists. Allowing the exploring of novel paths also enriches the set of possible paths that can be considered for any situation during simulation. Additionally, providing a mechanism to expand the set of possible actions of an autonomous vehicle can greatly improve their performance and safety.

The techniques described below can also be used to automatically generate vast amounts of training data for training perception systems. For example, a synthetic scene can be used to generate a large amount of fully labeled training data for urban scene segmentation. As another example, images containing novel placement of dynamic objects can be generated to boost performance of object detection. This greatly speeds up the process of obtaining training data for performing autonomous vehicle simulations and training perception systems. It also reduces the amount of actual training data that needs to be gathered from real-world environments. In fact, from one set of surfel data, many different sets of simulated sensor data can be generated from many different angles and distances, while remaining sufficiently high-quality to perform autonomous vehicle simulations.

The disclosed technologies can be easily extendable to new scenes that are driven by a self-autonomous vehicle. Furthermore, because the environment built using the disclosed technologies is a high-quality reconstruction based on vehicle sensors, the result can close the domain gap between synthetic and real images. In addition, using the techniques described below for reconstructing the 3D environment is beneficial because it provides for synthesizing novel views that cannot be captured in the real world.

In addition, the techniques described below reduce the amount of data that needs to be stored. In particular, the images can be generated on the fly rather than being pre-generated and stored. Moreover, querying for nearest captured views is no longer necessary as any arbitrary view that is desired can be generated automatically at simulation time. As a result, storage required for the simulated environment is drastically reduced and deployment of the simulated environment takes much less time.

DETAILED DESCRIPTION

This specification generally describes systems and methods to use a surfel map representation in generating simulated environmental data for performing autonomous vehicle simulations.

The techniques described below can use sensor data, e.g., camera and LiDAR data, collected during a single pass, or several passes, of an autonomous vehicle through a scene of interest. This data can be used to reconstruct the scene using a textured surfel rendering. Generating the textured surfel rendering is computationally efficient and can preserve rich information about the 3D geometry, semantics, and appearance of objects in the scene. Given the scene reconstruction using the surfel map, the scene can be rendered for novel poses of the self-driving vehicle (SDV) and other scenario agents. The rendered reconstruction for these novel views can have some missing parts due to occlusion differences between the initial and new scene configuration. The rendered reconstruction can also have visual quality artifacts due to the limited fidelity of the surfel reconstruction. To solve these issues, a GAN network can be applied to the rendered surfel reconstructions to produce final, high-quality image reconstructions.

The disclosed technology can generate simulated camera images for autonomous driving simulation. When provided with a novel trajectory of the self-driving vehicle in simulation, the disclosed technology can generate realistic visual sensor data that is useful for downstream modules, such as an object detector, a behavior predictor, or a motion planner. At a high level, a target environment can be scanned. A scene can be reconstructed of the target environment using rich textured surfels. The surfels can be rendered at a camera pose of a novel trajectory, alongside semantic and instance segmentation masks. Using a GAN, realistic-looking camera images can be generated. As a result, novel views in the scene can be rendered, corresponding to deviations of the self-driving vehicle and other agents in the environment from their initially captured trajectories.

Figure 1:
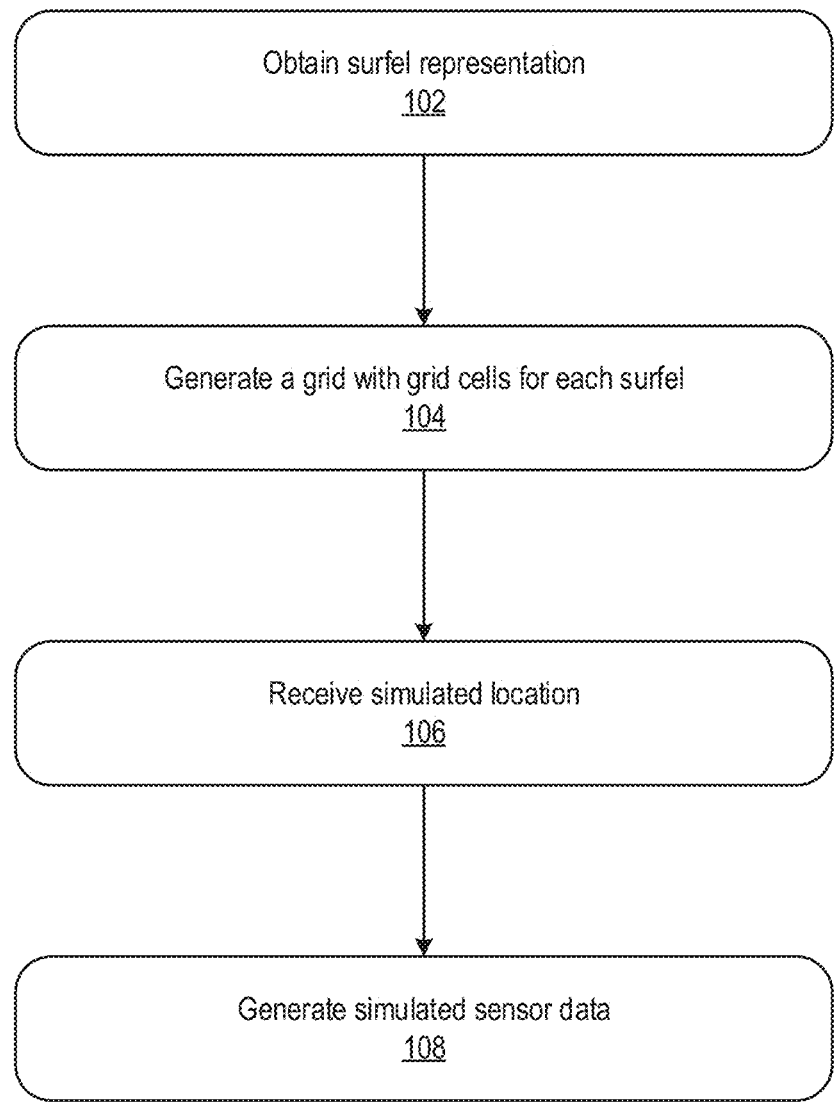
FIG. 1 is a flowchart of an example process to generate simulated sensor data.

FIG. 1 is a flowchart of an example process to generate simulated sensor data. In general, a system can use a surfel map to generate simulated sensor data. The example process aims to provide faithful preservation of original sensor information, while remaining efficient in terms of computation and storage. Towards this goal, a novel texture-enhanced surfel map can be generated.

Surfels are compact, easy to reconstruct, and because their size can be fixed, they can be efficiently textured and compressed. The example process can be performed by a system of one or more computers in one or more locations, e.g., by computers in a datacenter. The example process will be described as being performed by a system of one or more computers.

The system obtains a surfel map (102). In this specification, a surfel map is a collection of data that assigns a respective surfel to each of a plurality of points, in a three-dimensional space representing a real-world environment, that touch or intersect a surface in the real-world environment. The surfel map can be generated from sensor observations recorded in trip logs of trips through a real-world environment.

The surfel map can be based on a discretized 3D voxel grid. LiDAR scans, for example, can be processed in an order they are captured by the sensor observations of the real-world environment. For each voxel, a surfel disc can be constructed by estimating a mean coordinate and a surfel normal, based on all LiDAR points in that voxel. A surfel disk radius can be defined as $\sqrt{3}v$, where v denotes the voxel size. Colors corresponding to the LiDAR points binned in a voxel are also identified from the sensor observations (e.g., camera images). The colors can be used to estimate surfel color(s).

The system generates a grid for each surfel in the surfel map (104). Surfel maps can suffer from a trade-off between geometry consistency and fine-grained details. In other words, a large voxel size gives better geometry consistency but fewer details, while a small voxel size results in finer details but less stable geometry. The system can resolve this issue by using textures to achieving both good geometry consistency and rich texture details. The system can accomplish this by discretizing each surfel disc into a texture, with each cell within the texture having one or more respective colors that allows the system to encode higher-resolution texture details.

For example, for each surfel in the surfel map, the system can generate a respective grid having a plurality of grid cells, e.g., a k×k grid centered on the point centroid of the surfel. The system can use any appropriate value for k, e.g., 3, 5, or 8, to name just a few examples. Each grid can have an orientation matching an orientation of a corresponding surfel. The system can then assign, to each grid cell within each grid, one or more respective color values, which can for example be obtained from sensor data, e.g., camera images, recorded in the trip log data.

The textured surfel map can be further enhanced by generating multiple grids at various distances. Since each surfel can have a different appearance across different frames, due to variations of lighting conditions and changes of relative pose (e.g., distance and view angle), the surfel map can be enhanced creating a codebook of textures at n various distances. For example, the system can generate n=1, 3, 10, or 100, different grids for each surfel. For each texture bin, a color can be determined from the sensor observations. This can help to obtain a smooth surfel rendering.

The system receives a simulated location (106). The system can receive the simulated location as part of a simulation process for evaluating self-driving control systems, or as part of a process for generating training data.

During simulation, the system can generate candidate routes that a simulated vehicle could take under various circumstances. The system can, for example, use a point on a candidate route as the simulated location. One of the benefits of being able to generate simulated sensor data is that the system can generate such simulated sensor data for locations that no real vehicle has actually ever been to. For example, if a new road has just been constructed but no actual vehicle has had a chance to drive down it yet, the system could still simulate the views down the new road in order to evaluate the new road as a possible driving choice.

During training, the system can generate any appropriate number of simulated locations for an environment. For example, the system can generate simulated locations for every possible reachable location in a roadway. Because the data is simulated, the system can automatically generate an unbounded number of simulated locations. In addition, the system can generate simulated locations for places that real vehicles cannot actually travel to, such as sidewalks, pedestrian bridges, balconies, and stairways, to name just a few examples.

The system generates simulated sensor data (108). The simulated sensor data can be generated by combining color information from surfel grid cells that are visible from the simulated location within the simulated representation of the real-world environment.

The system can select which surfel grid to use based on a camera pose. For example, during rendering, the system can select a particular k×k grid to use based on a camera pose. The texture of the grid can help to reduce the effects of artifacts at object boundaries and non-smooth coloring at non-boundary areas. In addition, the texture-enhanced surfel map can eliminate much of the artifacts and can result in vivid-looking images.

The system can apply special processing procedures for dynamic objects. For example, reconstructed vehicle models can be placed in any location of choice. In the case of the pedestrians, which are deformable objects, a separate surfel model can be generated separately for each LiDAR scan. The reconstructed pedestrian can then be placed anywhere in the scene for that scan. Vehicles can be considered rigid dynamic objects. As a result, a separate model can be reconstructed for each vehicle. For example, the system can use high-quality 3D bounding box annotations to accumulate LiDAR points from multiple scans for each object of interest, e.g., vehicle. An Iterative Closest Point (ICP) algorithm can then be applied to refine point cloud registration. As a result, a dense point cloud can be produced that allows an accurate, enhanced surfel reconstruction for each vehicle. In some implementations, 3D box ground-truth may not be required. Vehicle detection and tracking algorithms can also be used by the disclosed technology to get initial estimates for ICP.

The system can also enhance the surfel rendering using a surfel-GAN model. While surfel scene reconstruction provides a rich representation of the environment, it can produce surfel-based renderings that have a non-negligible realism gap when compared to real camera images. This can result from incomplete reconstruction and imperfect geometry and texturing. Therefore, a surfel-GAN model can be applied to produce more realistic-looking images.

Figure 2A:
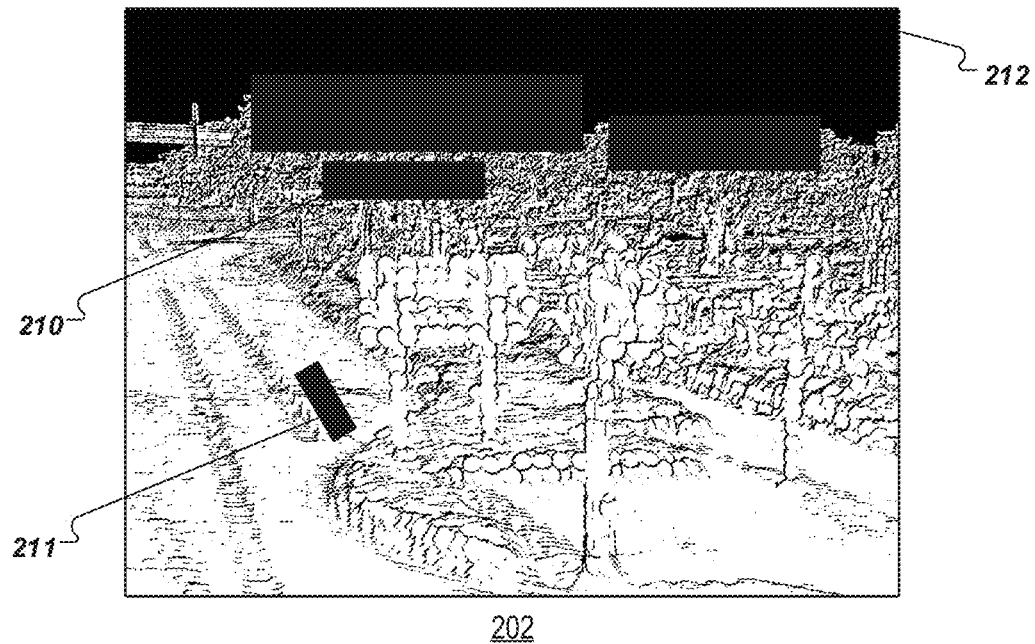
FIGS. 2A-B depict simulated sensor data generated by the techniques described herein.
Figure 2B:
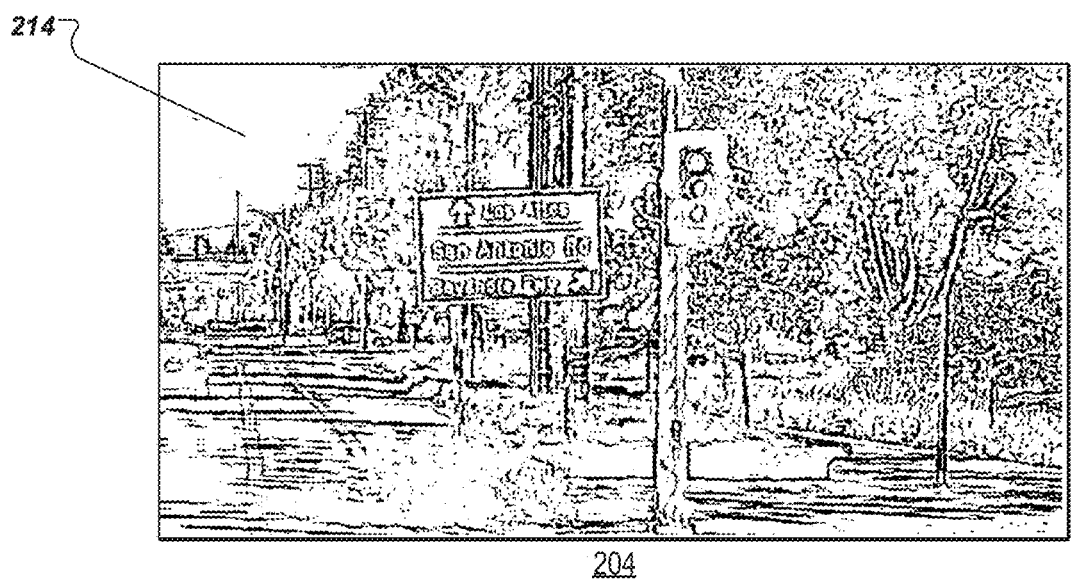

FIGS. 2A-2B depict simulated sensor data generated by the techniques described herein. FIG. 2A illustrates an example surfel rendering 202, which as described above, can be generated by combining color information from surfels in a surfel map. FIG. 2B illustrates an image 204 that is an example of how the surfel rendering 202 can be enhanced by application of a surfel-GAN model.

As shown in FIG. 2A, the surfel rendering 202 has several noticeable defects. In particular, the surfel rendering 202 has holes 210, 211, and 212 where, for some reason or another, there was no corresponding surfel or no corresponding surfel color information.

In addition, because surfels represent generally flat surfaces in the environment, there are many locations in view that will never have any data. This includes the tops of trees and the sky, which in the surfel rendering 202 is jagged, unrealistic, and empty.

As depicted, after application of the surfel-GAN model, the gaps, holes, and other spaces that are missing in the first image 202 are automatically filled in. Therefore, in the image 204, the sky 214 is automatically filled in, possibly with simulated clouds, and the tops of trees are automatically filled in with simulated tree data. In addition, other objects, including roads, traffic lights, lamp posts, and signs, become clearer and more realistically portrayed.

Additional examples of a surfel-GAN model enhancing a surfel rendering in various ways are described in Zhenpai Yang et al., *SurfelGAN: Synthesizing Realistic Sensor Data for Autonomous Driving*, in the proceedings of the 2020 Conference on Computer Vision and Pattern Recognition (submitted May 8, 2020), which is herein incorporated by reference. In some implementations, surfels can be rendered at the camera pose of a novel trajectory, alongside semantic and instance segmentation masks. Through a GAN, realistically looking camera images can be generated. In some implementations, the system can treat the semantic and instance segmentation maps as additional rendered image channels. Because during the reconstruction of the surfel scenes the category for each surfel is known, the system can derive both semantic and instance segmentation masks by first rendering an index map that associates each pixel with a surfel index and then determining the semantic class or instance number through a look-up table.

Figure 3:
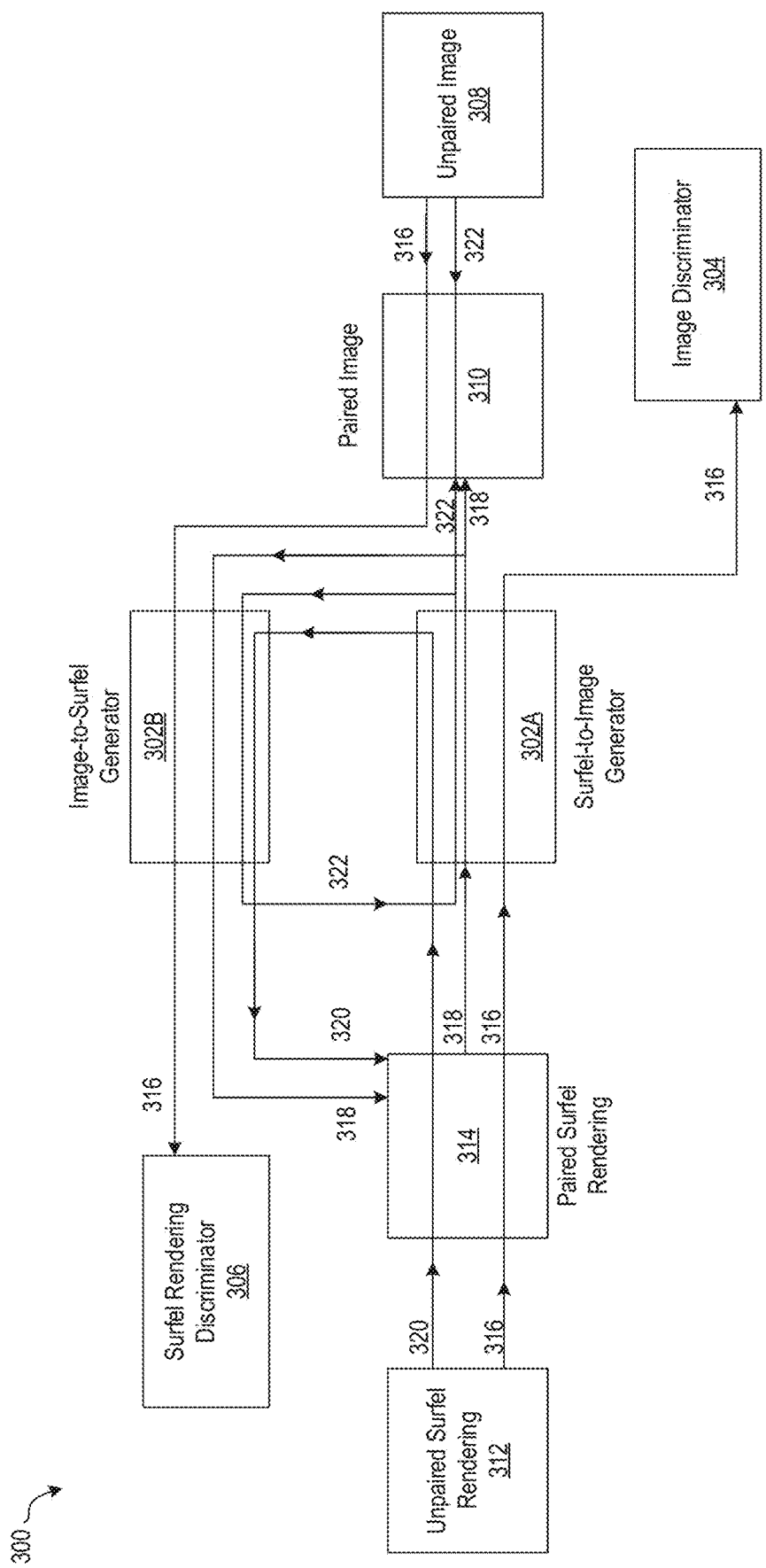
FIG. 3 is a system diagram for generating simulated sensor data.

FIG. 3 is a system diagram of an example surfel-GAN model. As described above, while surfel scene reconstruction provides a rich representation of the environment, surfel renderings can have a non-negligible realism gap when compared to real images. This can result from incomplete reconstruction and imperfect geometry and texturing. A surfel-GAN is a generative model that converts surfel renderings to more realistic-looking images. In some implementations, the surfel-GAN model produces other outputs as well. For example, semantic and instance segmentation maps can be output as additional rendered image channels.

As depicted, a system 300 implementing a surfel-GAN model can include a surfel-to-image generator 302A, an image-to-surfel generator 302B, an image discriminator 304, and a surfel rendering discriminator 306. Unpaired images 308, paired images 310, unpaired surfel renderings 312, and paired surfel renderings 314 can be inputs and outputs of the surfel-GAN model. The training arrangement of the system 300 has two symmetric encoder-decoder generators mapping from surfel renderings to real images, e.g., the surfel-to-image generator 302A; and vice versa, e.g., the image-to-surfel generator 302B. Additionally, two discriminators, an image discriminator 304 and a surfel rendering discriminator 306 can specialize in surfel and real image domains.

The flows illustrated in FIG. 3 represent losses used to train the surfel-GAN model. The flow 318 represents a supervised reconstruction loss. The flow 316 represents an adversarial loss. The flows 320 and 322 represent cycle-consistency losses. When training with paired data, e.g., using WOD-TRAIN, surfel renderings translate to real images, and a one-directional supervised reconstruction loss, e.g., SurfelGAN-S, represented by the flow 318, can be applied. An additional adversarial loss, e.g., SurfelGAN-SA, represented by the flow 316, can optionally be applied. When training with unpaired data, training can start with either surfel renderings, e.g., WOD-TRAIN-NV, or real images, e.g., Internal Camera Dataset. One of the encoder-decoder networks 302A or 302B can then be used to get to the other domain and back. Cycle consistency loss can also be applied, e.g., SurfelGAN-SAC, represented by the flows 320 and 322. The encoder-decoder networks 302A and 302B can, for example, include 8 convolutional and 8 deconvolutional layers. Discriminators 304 and 306 can include 5 convolutional layers. In some examples, the network can operate on 256×256 input images.

As an example, the surfel-to-image generator 302A, $G^{S \rightarrow I}$, can be an encoder-decoder model with learnable parameters $\theta_S$. Given pairs of surfel renderings 314 and images 310, a supervised loss can be applied to train the generator 302A, e.g., represented by flow 318. A surfel-GAN model that is trained with supervised learning can be referred to as a SurfelGAN-S model.

Additionally, an adversarial loss, e.g., represented by flow 316, can be applied from the real image discriminator 304. A surfel-GAN model trained with this additional adversarial loss can be referred to as a SurfelGAN-SA model.

However, in reality paired training data between surfel renderings and real image data is usually very limited. Unpaired data can be easier to obtain. Therefore, unpaired data can be leveraged to (1) improve generalization of the discriminator 304 by training with more unlabeled examples, and (2) regularize the generator 302A by enforcing cycle consistency.

As an example, image-to-surfel generator 302B, $G^{I \to S}$, can be another encoder-decoder model which has the same architecture as generator 302A except more output channels for semantic and instance maps. Then any surfel rendering, paired 314 or unpaired 312 can be translated to a real image and translated back to a surfel rendering, where a cycle consistency loss, e.g., represented by flows 320 and 322, can be applied. The same can be applied to any paired 310 and/or unpaired 308 real image as well.

The surfel rendering discriminator 306 can then judge generated surfel images. Surfel-GANs trained with additional cycle consistency losses, e.g., represented by flows 320 and 322, can be referred to as SurfelGAN-SAC models. The following objective function can then be optimized as follows:

$$\max_{\phi_S, \phi_I} \min_{\psi_S, \psi_I} = \mathcal{L}_r(G_{\theta_S}^{S \to I}, S_p, \mathcal{I}_p) + \lambda_1 \mathcal{L}_r(G_{\theta_I}^{I \to S}, \mathcal{I}_p, S_p) + \quad (1)$$
$$\lambda_2 \mathcal{L}_a(G_{\theta_S}^{S \to}, D_{\phi_I}^I, S_{p,u}) + \lambda_3 \mathcal{L}_a(G_{\theta_I}^{I \to S}, D_{\phi_S}^S, \mathcal{I}_{p,u}) +$$
$$\lambda_4 \mathcal{L}_c(G_{\theta_S}^{S \to I}, G_{\theta_I}^{I \to S}, S_{p,u}) + \lambda_5 \mathcal{L}_c(G_{\theta_I}^{I \to S}, G_{\theta_S}^{S \to I}, \mathcal{I}_{p,u}),$$

where $L_r$, $L_a$, $L_c$ denote the supervised reconstruction, adversarial and cycle consistency loss, respectively. A hinged Wasserstein loss can be used for adversarial training to help stabilize training. A £$^1$-loss can be used as reconstruction and cycle-consistency loss for renderings and images and cross entropy loss for semantic and instance maps.

In some implementations, the surfel-GAN model can include two encoder-decoder networks $G_{\theta_1}{}^1$ and $G_{\theta_2}{}^2$ and two discriminator networks $D_{\phi_1}{}^1$ and $D_{\phi_2}{}^2$, wherein $\theta_1$ and $\theta_2$ are parameters of the two encoder-decoder networks, and wherein $Ø_1$ and $Ø_2$ are parameters of the two discriminator networks. In some implementations, the system can train the surfel-GAN model using paired training data and unpaired training data to optimize the following objective function:

$$\max_{\theta_1, \theta_2} \min_{\phi_1, \phi_2} = \lambda_1 \mathcal{L}_{adv}(G_{\theta_1}^1, D_{\phi_1}^1, Y, Y^{-1}) + \lambda_2 \mathcal{L}_{adv}(G_{\theta_2}^2, D_{\phi_2}^2, I, I') +$$
$$\lambda_3 \mathcal{L}_r(G_{\theta_1}^1, I, Y) + \lambda_4 \mathcal{L}_r(G_{\theta_2}^2, I, Y) + \lambda_5 \mathcal{L}_c(G_{\theta_1}^1, G_{\theta_2}^2, I, I', Y, Y'),$$

wherein $\mathcal{L}_{adv}$, $\mathcal{L}_r$, $\mathcal{L}_c$ are adversarial loss, reconstruction loss, and cycle consistency loss, respectively, wherein $\lambda_1, \lambda_2, \lambda_3, \lambda_4,$ and $\lambda_5$ are weights of the adversarial loss, the reconstruction loss, and the cycle consistency loss, respectively, wherein the paired training data includes pairs of textured surfel renderings I and corresponding ground truth sensor data Y, and wherein the unpaired training data includes unpaired textured surfel renderings I' and unpaired sensor data Y'.

In the case of limited coverage of the original surfel map, surfel renderings can contain large areas of unknown regions. The uncertainty in those regions can be higher than that of a region with surfel information. Also, distance between a camera and the surfel introduces another factor of uncertainty. Therefore, a distance weighted loss can be used to stabilize surfel-GAN training. For example, during data preprocessing, a distance map can be generated that records a nearest distance to an observed region and uses the distance information as weighting coefficients to modulate the reconstruction loss.

Moreover, the Adam optimizer can be used for training. An initial learning rate can be set to 2e-4 for both the generator and the discriminator, with β1=0.5 and 62 2=0.9. Batch normalization can be used after Relu activation. The system can then use λ1=1, λ2, λ3=0.001, and λ4, λ5=0.1. In some examples, total training time of the disclosed network can be 3 days, based on one Nvidia Titan V100 GPU with batch size 8.

A new surfel image rendering can be generated for each frame in the original dataset. Although this dataset comes for free (e.g., any number of testing frames can be generated) the dataset does not have corresponding camera images. Therefore, this dataset can be used for unpaired training and only some types of evaluation (e.g., refer to FIG. 3).

Additional 9.8 k short sequences (100 frames for each) similar to WOD images can also be captured. These un-annotated images can used for unpaired training of real images (e.g., refer to FIG. 3).

Finally, a unique dataset, Dual-Camera-Pose Dataset (DCP), can be built and tailored for measuring realism of the disclosed model/technology. The dataset can include scenarios where two or more vehicles observe the same scene at the same time. For example, the interval can be where two vehicles are within 20 m of each other. Sensor data from the first vehicle can be used to reconstruct the scene and render the surfel image at the exact pose of the second vehicle. After filtering cases where the scene reconstruction is too incomplete, approximately 1,000 pairs can be obtained to directly measure a pixel-wise accuracy of the generated image.

Exemplary experiments were performed on three variants of the disclosed techniques. The first is supervised (Surfel-GAN-S), which is training the surfel-rendering-to-image model in a supervised way by minimizing an f1-loss between the generated image and the ground-truth real image. This type of training can require paired data. As a result, train can be performed on WOD-TRAIN.

The second variant is supervised+adversarial (Surfel-GAN-SA). This training can be performed on WOD-TRAIN. An adversarial loss alongside the f1-loss can be added.

The third variant is supervised+adversarial+cycle (SurfelGAN-SAC). In this variation, WOD-TRAIN-NV and the Internal Camera Image Dataset can also be used. Since these two sets are unpaired, the supervised loss may not apply. A cycle-consistency loss can be used in addition to the adversarial loss, as discussed above.

The generated camera data can be evaluated using a downstream perception module. In other words, it is beneficial to know how well an off-the-shelf vehicle object detector performs on generated images without any fine-tuning. This can be a test of whether the detector statistics on the generated images match those it obtains on the real images. For example, a vehicle detector with a ResNet architecture and an SSD detection head can be used, trained, and evaluated on resized images in 512×512 resolution from a mixture of datasets that can include WOD-TRAIN.

The three SurfelGAN model variants described above can be trained on a mixture of WOD-TRAIN, WOD-TRAIN-NV, and the Internal Camera Image Dataset, as well as generated images on WOD-TRAIN-NV, WOD-EVAL and WOD-EVAL-NV The texture-enhanced surfel scene reconstruction discussed throughout can produce surfel renderings that achieve good detection quality on the WOD-EVAL set at 52.1% AP@50 (average precision metric). There can still be a gap between these surfel renderings and real images at 61.9%, which is why the GAN network is applied. As described herein, the three variants SurfelGAN-S, -SA and -SAC gradually improve over baseline surfel renderings. SurfelGAN-SAC can improve the AP@50 metric from 52.1% to 62.0% on WOD-EVAL, which is on par with real images at 61.9%. This demonstrates that images generated by SurfelGAN-SAC can be close to real images in the eyes of the detector. As a result, the SurfelGAN model described throughout generalizes well since the relative improvement of SurfelGAN over the baseline is very similar between the WOD-TRAIN-NV and WOD-EVAL-NV. Moreover, although SurfelGAN improved by roughly 10% over the baseline with both WOD-TRAIN-NV and WOD-EVAL-NV, there is a noticeable quality difference between the two. To better understand this difference, the metrics of SurfelGAN-SAC on WOD-EVAL-NV can be broken down according to how much each pose deviates from original poses in WOD-EVAL. The deviation d(.) can be defined as a weighted sum of both translational and rotational differences of the poses:

$$d((t, R), (t', R')) = \|t - t'\| + \lambda_R \frac{\|\log(R^T R')\|}{\sqrt{2}} \quad (2)$$

where t and R are the pose (translation and rotation) of the novel view in WOD-EVAL-NV, and $t'$, $R'$ the pose of its closest pose in WOD-EVAL. $\lambda_R$ can be 1.0. Using this formula, it can be determined that surfel renderings have a quality bias with regards to viewing direction. As a result, to have higher quality synthesized data, there should not be too much perturbation from the original poses. This problem, however, can be ameliorated by reconstructing the surfel scene from multiple runs/passes.

The Dual-Camera-Pose (DCP) Dataset previously mentioned can contain scenarios in which two vehicles observe the same scene at the same time. Using this dataset, a surfel scene can be reconstructed using one camera. Images can be generated from a point of view of a second camera. Each generated image can be matched to the real one and the f1-distance error on the pixels that are covered by the surfel rendering can be reported. This is to ensure that there is a fair comparison between the surfel renderings and the generated images. As previously described, the model can be trained using WOD-TRAIN, WOD-TRAIN-NV, and the Internal Camera Image Dataset. SurfelGAN improves on top of the surfel renderings, generating images that are closer to real images in f1-distance. Moreover, the SurfelGAN-S version can outperform SA and/or SAC that used additional losses and data during training. This finding is not unexpected since SurfelGAN-S optimizes for the f1-distance.

As another example, the model described throughout this disclosure can be used to determine whether SurfelGAN-generated images from perturbed views are a helpful form of data augmentation for training a vehicle object detector. For the baseline, a vehicle detector can be trained on WOD-TRAIN. The detector's quality can be evaluated on WOD-EVAL. Another vehicle detector can also be trained using both WOD-TRAIN and surfel images generated from WOD-TRAIN-NV. This vehicle detector can also be evaluated on WOD-EVAL.

WOD-TRAIN-NV inherits 3D bounding boxes from WOD-TRAIN, and may not contain tightly-fitting 2D bounding boxes like those in WOD-TRAIN. Therefore, the latter can be approximated by projecting all surfels in the 3D bounding boxes to the 2D novel view. The axis-aligned bounding box can be taken as an approximation. Based on this training, data augmentation significantly boosts the average precision metric, improving the AP@50 score from 21.9% to 25.4%, the AP@75 from 10.8% to 12.1%, and the average AP from 11.9% to 13.0%. These AP scores can be lower than AP scores previously mentioned because images are resized differently in order to use the off-the-shelf detector previously mentioned. The training here can be performed directly on surfel renderings, which results in an improvement over training only on WOD-TRAIN. Using SurfelGAN synthesized images yields a more significant improvement, which further demonstrates the realism of the disclosed technology.

The disclosed technology presents a simple yet effective data-driven approach, which can synthesize camera data for autonomous driving simulations. Based on the camera and LiDAR data captured by a vehicle pass through a scene, a 3D model can be reconstructed using texture-enhanced surfel map representation. Given this representation, novel views and configurations of objects in the scene can be rendered. A SurfelGAN image synthesis model as described herein can be used to fix reconstruction, occlusion, and/or rendering artifacts. The disclosed technology can generate high-level realism of synthesized sensor data that can also be used for training dataset augmentation for deep neural networks.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
performing a scene reconstruction process comprising:
obtaining a surfel map generated from sensor observations of a real-world environment, wherein the surfel map assigns a surfel to each of a plurality of points in a three-dimensional space of the real-world environment, and
generating, for each surfel in the surfel map, a respective grid having a plurality of grid cells, wherein each grid has an orientation matching an orientation of a corresponding surfel, and wherein each grid cell within each grid is assigned a respective color value; and
performing a synthesis process to generate simulated sensor data, the synthesis process comprising:
receiving a simulated location within a simulated representation of the real-world environment, and
generating a textured surfel rendering including combining color information from grid cells visible from the simulated location within the simulated representation of the real-world environment.

Embodiment 2 is the method of embodiment 1, wherein the textured surfel rendering generated from the color information of the grid cells visible from the simulated location.

Embodiment 3 is the method of any one of embodiments 1-2, further comprising generating, for each surfel in the surfel map, multiple respective grids at each of a predetermined number of distances, and wherein generating the textured surfel rendering comprises:

selecting, for each surfel having grid cells visible from the location, a respective grid based on a respective distance to the surfel; and combining color information from each respective grid selected based on the respective distance to a corresponding surfel.

Embodiment 4 is the method of any one of embodiments 1-3, wherein generating the simulated sensor data comprises inputting the textured surfel rendering to a generative neural network trained to generate simulated camera images from grid cells having color information.

Embodiment 5 is the method of embodiment 4, wherein the generative neural network is an encoder-decoder network, wherein an encoder of the encoder-decoder network performs a convolution process on the color information of the textured surfel rendering, and wherein a decoder of the encoder-decoder network performs a deconvolution process on an output of the encoder.

Embodiment 6 is the method of embodiment 5, further comprising training the generative neural network using a generative adversarial training process, including, for each training example in a set of training images:

using the generative neural network to generate simulated sensor data; and using a discriminator neural network to determine whether the output of the generative neural network is simulated sensor data or real camera data.

Embodiment 7 is the method of embodiment 4, wherein the generative neural network comprises four sub-networks comprising two encoder-decoder networks $G_{\theta_1}^1$, $G_{\theta_2}^1$ and two discriminator networks $D_{\phi_1}^1$ and $D_{\phi_2}^2$.

Embodiment 8 is the method of embodiment 7, further comprising training the generative neural network to optimize the following objective function:

$$\max_{\theta_1,\theta_2} \min_{\phi_1,\phi_2} = \lambda_1 \mathcal{L}_{adv}(G_{\theta_1}^1, D_{\phi_1}^1, Y, Y') + \lambda_2 \mathcal{L}_{adv}(G_{\theta_2}^2, D_{\phi_2}^2, I, I') +$$
$$\lambda_3 \mathcal{L}_r(G_{\theta_1}^1, I, Y) + \lambda_4 \mathcal{L}_r(G_{\theta_2}^2, I, Y) + \lambda_5 \mathcal{L}_c(G_{\theta_1}^1, G_{\theta_2}^2, I, I', Y, Y'),$$

wherein $\mathcal{L}_{adv}$, $\mathcal{L}_r$, $\mathcal{L}_c$ are adversarial loss, reconstruction loss, and cycle consistency loss, respectively.

Embodiment 9 is the method of any one of embodiments 6-8, wherein the training data for training the generative neural network comprises:

paired training data comprising pairs of surfel grid renderings and corresponding ground truth camera images, and unpaired training data comprising:
unpaired textured surfel renderings, and
unpaired camera images.

Embodiment 10 is the method of any one of embodiments 7-9, wherein a first discriminator network discriminates between unpaired textured surfel renderings and paired textured surfel renderings, and wherein a second discriminator network discriminates between paired camera images and unpaired camera images.

Embodiment 11 is the method of any one of embodiments 1-10, further comprising performing an autonomous vehicle simulation including using the simulated sensor data for performing object detections by a simulated autonomous vehicle.

Embodiment 12 is the method of any one of embodiments 9-11, wherein using the simulated sensor data comprising performing object detections on images that do not exist in the training data.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
performing a scene reconstruction process comprising:
obtaining a surfel map generated from sensor observations of a real-world environment, wherein the surfel map assigns a surfel to each of a plurality of points in a three-dimensional space of the real-world environment, and generating, for each surfel in the surfel map, a surfel textures; and performing a synthesis process to generate simulated sensor data from a simulated location in the surfel map, the synthesis process comprising:
generating a textured surfel rendering from surfel textures visible from the simulated location,
generating one or more segmentation maps from the surfel map, and processing an input comprising: (i) the textured surfel rendering generated from the surfel textures, and (ii) the one or more segmentations maps using a generative adversarial network to generate the simulated sensor data from the simulated location.

2. The method of claim 1, wherein the generative adversarial network is an encoder-decoder network, wherein an encoder of the encoder-decoder network performs a convolution process on color information of the textured surfel rendering, and wherein a decoder of the encoder-decoder network performs a deconvolution process on an output of the encoder.

3. The method of claim 2, further comprising training the generative adversarial network using a generative adversarial training process, including, for each training example in a set of training images:
   using the generative adversarial network to generate simulated sensor data; and
   using a discriminator neural network to determine whether the output of the generative adversarial network is simulated sensor data or real sensor data.

4. The method of claim 3, wherein training data for training the generative adversarial network comprises:
   paired training data comprising pairs of textured surfel renderings and corresponding ground truth camera images, and
   unpaired training data comprising:
      unpaired textured surfel renderings, and
      unpaired camera images.

5. The method of claim 4, wherein using the simulated sensor data comprises performing object detections on images that do not exist in the training data.

6. The method of claim 1, wherein the generative adversarial network comprises four sub-networks comprising two encoder-decoder networks $G_{\theta_1}^1$, $G_{\theta_2}^2$ and two discriminator networks $D_{\phi_1}^1$ and $D_{\phi_2}^2$, wherein $\theta_1$ and $\theta_2$ are parameters of the two encoder-decoder networks, and wherein $\varnothing_1$ and $\varnothing_2$ are parameters of the two discriminator networks.

7. The method of claim 6, further comprising training the generative adversarial network using paired training data and unpaired training data to optimize the following objective function:

$$\max_{\theta_1,\theta_2} \min_{\phi_1,\phi_2} = \lambda_1 \mathcal{L}_{adv}(G_{\theta_1}^1, D_{\phi_1}^1, Y, Y') + \lambda_2 \mathcal{L}_{adv}(G_{\theta_2}^2, D_{\phi_2}^2, I, I') +$$
$$\lambda_3 \mathcal{L}_r(G_{\theta_1}^1, I, Y) + \lambda_4 \mathcal{L}_r(G_{\theta_2}^2, I, Y) + \lambda_5 \mathcal{L}_c(G_{\theta_1}^1, G_{\theta_2}^2, I, I', Y, Y'),$$

wherein $\mathcal{L}_{adv}$, $\mathcal{L}_r$, $\mathcal{L}_c$ are adversarial loss, reconstruction loss, and cycle consistency loss, respectively, wherein $\lambda_1$, $\lambda_2$, $\lambda_3$, $\lambda_4$, and $\lambda_5$ are weights of the adversarial loss, the reconstruction loss, and the cycle consistency loss, wherein the paired training data comprises pairs of textured surfel renderings I and corresponding ground truth sensor data Y, and wherein the unpaired training data comprises unpaired textured surfel renderings I' and unpaired sensor data Y'.

8. The method of claim 6, wherein a first discriminator network discriminates between unpaired textured surfel renderings and paired textured surfel renderings, and
   wherein a second discriminator network discriminates between paired camera images and unpaired camera images.

9. The method of claim 1, further comprising performing an autonomous vehicle simulation including using the simulated sensor data for performing object detections by a simulated autonomous vehicle.

10. The method of claim 1, wherein the one or more segmentation maps comprises a semantic segmentation mask and an instance segmentation mask.

11. The method of claim 1, wherein generating, for each surfel in the surfel map, a surfel texture comprises: generating, for each surfel in the surfel map and each location in the surfel map, a plurality of surfel textures corresponding respectively to a plurality of different distances between the surfel and each location in the surfel map.

12. A system comprising:
   one or more computers and one or more storage devices storing instructions that are operable, when executed by the one or more computers, to cause the one or more computers to perform operations comprising:
      performing a scene reconstruction process comprising:
         obtaining a surfel map generated from sensor observations of a real-world environment, wherein the surfel map assigns a surfel to each of a plurality of points in a three-dimensional space of the real-world environment, and
         generating, for each surfel in the surfel map, a surfel textures; and
      performing a synthesis process to generate simulated sensor data from a simulated location in the surfel map, the synthesis process comprising:
         generating a textured surfel rendering from surfel textures visible from the simulated location,
         generating one or more segmentation maps from the surfel map, and
         processing an input comprising: (i) the textured surfel rendering generated from the surfel textures, and (ii) the one or more segmentations maps using a generative adversarial network to generate the simulated sensor data from the simulated location.

13. The system of claim 12, wherein the generative adversarial network is an encoder-decoder network, wherein an encoder of the encoder-decoder network performs a convolution process on color information of the textured surfel rendering, and wherein a decoder of the encoder-decoder network performs a deconvolution process on an output of the encoder.

14. The system of claim 13, the operations further comprise training the generative adversarial network using a generative adversarial training process, including, for each training example in a set of training images:
   using the generative adversarial network to generate simulated sensor data; and
   using a discriminator neural network to determine whether the output of the generative adversarial network is simulated sensor data or real sensor data.

15. The system of claim 14, wherein training data for training the generative adversarial network comprises:
   paired training data comprising pairs of textured surfel renderings and corresponding ground truth camera images, and
   unpaired training data comprising:
      unpaired textured surfel renderings, and
      unpaired camera images.

16. The system of claim 12, the operations further comprise performing an autonomous vehicle simulation including using the simulated sensor data for performing object detections by a simulated autonomous vehicle.

17. The system of claim 12, wherein the one or more segmentation maps comprises a semantic segmentation mask and an instance segmentation mask.

18. One or more non-transitory computer storage media encoded with computer program instructions that when executed by one or more computers cause the one or more computers to perform operations comprising:

performing a scene reconstruction process comprising:

obtaining a surfel map generated from sensor observations of a real-world environment, wherein the surfel map assigns a surfel to each of a plurality of points in a three-dimensional space of the real-world environment, and generating, for each surfel in the surfel map, a surfel textures; and performing a synthesis process to generate simulated sensor data from a simulated location in the surfel map, the synthesis process comprising:

generating a textured surfel rendering from surfel textures visible from the simulated location, generating one or more segmentation maps from the surfel map, and processing an input comprising: (i) the textured surfel rendering generated from the surfel textures, and (ii) the one or more segmentations maps using a generative adversarial network to generate the simulated sensor data from the simulated location.

19. The one or more non-transitory computer storage media of claim 18, wherein the generative adversarial network is an encoder-decoder network, wherein an encoder of the encoder-decoder network performs a convolution process on color information of the textured surfel rendering, and wherein a decoder of the encoder-decoder network performs a deconvolution process on an output of the encoder.

20. The non-transitory computer storage media of claim 18, wherein the one or more segmentation maps comprises a semantic segmentation mask and an instance segmentation mask.

* * * * *